Aug. 27, 1963

W. M. STEARNS 3,101,937

COMBINATION SPRING-PISTON VIBRATION ISOLATOR

Filed Oct. 25, 1960

*INVENTOR.*
WILLIAM M. STEARNS

BY Alban Rothenberg

ATTORNEY

INVENTOR.
WILLIAM M. STEARNS
BY
ATTORNEY

Aug. 27, 1963 W. M. STEARNS 3,101,937
COMBINATION SPRING-PISTON VIBRATION ISOLATOR
Filed Oct. 25, 1960 3 Sheets-Sheet 3

INVENTOR.
WILLIAM M. STEARNS
BY
Allan Rothenberg
ATTORNEY

United States Patent Office 3,101,937
Patented Aug. 27, 1963

3,101,937
COMBINATION SPRING-PISTON VIBRATION
ISOLATOR
William M. Stearns, La Mirada, Calif., assignor to
North American Aviation, Inc.
Filed Oct. 25, 1960, Ser. No. 64,882
11 Claims. (Cl. 267—1)

This invention relates to a vibration isolator and more particularly to a vibration isolator providing both spring restraint and fluid damping action.

A vibration isolator is generally described physically as a spring-restrained mass, or mathematically as a second order mechanical system. The principle upon which spring-restrained vibration isolators function is the amplitude attenuation effect upon motion of the load mass in response to input motions or forces at frequencies above the resonant or natural vibrational frequency of the vibration isolator and load-mass combination. A given input to a vibration isolator can be expressed as a series of sinusoidal inputs of various frequencies, amplitudes and time-phase relationships. For a given amplitude of sinusoidal input vibration or motion, high frequency vibrations provide the largest accelerations or forces most likely to cause structural damage, since the peak acceleration resulting from a sinusoidal vibration is proportional to the square of the input frequency. Therefore, the high-frequency attenuation characteristic of a second order spring-mass mechanical system is particularly useful to isolate a delicate load mass from the destructive force of high frequency vibrations. For instance, where a given equipment environment is known or suspected to demonstrate vibrations at frequencies above a given frequency, then the construction of a spring-mass combination having a resonant or natural vibrational frequency equal to or less than the given frequency will attenuate such higher frequency vibrations or tend to isolate the load mass from such vibrations. The system will not isolate the load mass from vibrations of frequencies less than the system resonant frequency; but this characteristic is not deemed critical because the attendant low frequency accelerations or forces are relatively low, being proportional to the square of the applied frequency. However, any random force input or motion excitation is sufficient to cause amplification or a build-up of destructive vibrations at the resonant frequency of the spring-mass combination, in the absence of velocity-damping. Where elastomeric or rubber-like materials are used in the construction of the springs of the spring-mass combination, some damping is provided in the inherent physical properties of such material. However, most practical vibration-isolator devices and applications thereof have required the addition of separate fluid dampers or dashpot elements to supplement such damping properties.

In developing the concept of a combination shock mount, it would seem desirable to have spring and damping restraint along three degrees of freedom. However, there is actually little or no advantage to be thus gained. In order to obtain damping in all six degrees of freedom of motion of a rigid body, three shock mounts are required even if each shock mount were to provide damping along three axes; (two such shock mounts would allow damped rotational motion about their common axis). If each shock mount has damping along only two axes, the minimum number of mounts required for damping in six degrees of freedom is still three. For this reason, plus the difficulty in obtaining damping along three axes in a single shock mount, a shock mount providing damping along two mutually orthogonal axes appears to be a particularly useful concept.

Accordingly, an object of this invention is to provide a vibration isolator having fluid damping along two mutually orthogonal axes.

In carrying out the principles of this invention in accordance with a preferred embodiment thereof, there is provided: a load means for mounting a load, a base means, and first, second, third and fourth flexible supports. Each of the flexible supports is positioned between the load means and base means, and intercouples with the load means and the base means. The first and third supports are oppositely disposed relative to each other, and the second and fourth supports are adjacent to both said first and third supports and being similarly oppositely disposed relative to each other, each of said flexible supports having a cavity filled with a relatively incompressible fluid. A first orificed connection interconnects the cavities of the first and third flexible supports in fluid circuit, and a second orificed connection interconnects the cavities of the second and fourth flexible supports in fluid circuits, whereby six-degree freedom of motion of the load means relative to the base means is restrained by the flexible support, and allowable translational motion along two mutually orthogonal axes is further subject to fluid damping.

In a combination spring and damper shock mount, the use of elastomeric or rubber-like materials having inherent damping properties have yet in practice required the addition of separate and additional fluid dampers in order for the shock mount to provide adequate damping, particularly at resonant frequencies of the shock mount and load mass combination. The elimination of a separate fluid damper and the integration of the fluid damper function in the elastomeric spring assembly would provide several advantages of simplicity and economy.

Accordingly, a further object of this invention is to provide a spring-piston isolator combining fluid damper action and spring action into a simple elastomeric shock mount.

A still further object of this invention is to provide an integrated device having fewer component parts and which permits easier assembly than does a device consisting of separate springs and dampers.

Past efforts in the art to combine the spring restraint function and hydraulic piston of the fluid damper function in an integral elastomeric or rubber-like support element of a vibration isolator have met with limited and unsure success in practice due to the stiffness ratio, the ratio of the stiffness of the flexible element to the stiffness of the combination of the flexible element filled with damping fluid. The inherent performance limitations are to be appreciated from a consideration of two extreme situations. Conceptually, the fluid damper element and the spring restraint element have been viewed, for convenience of analysis, as being in parallel, such that their forces are summed in a force sentence (with the force of the accelerating load mass) and resulting in a common output motion of the load mass. In the first instance, if the fluid damper orifice is of an effectively non-restrictive nature as to induce no resistive or restraining forces in the flow of the damping fluid or if the system were operated without the use of damping fluid, then the system will behave as an undamped spring-restrained mass, where the effective spring is the spring constant of the flexible support element. In the second instance, at the other extreme, the fluid damper orifice is restricted or blocked until in the limit no fluid flow can occur. Then, the dash pot element appears as a hydraulic spring. Since the dash pot element is in parallel with the flexible support element, the effective spring constant in the second instance is that of the hydraulic fluid plus that of the flexible support element. Since the natural frequency of a given second order mechanical system is proportional to the square root of the effective spring constant, the effect of such greater spring constant in the second instance is a higher resonant frequency for the system which therefore, does not attenuate high frequency vibrations. Further the absence of adequate damping would allow excitation of the high frequency resonant mode of the blocked system. Such effect to a lesser degree would occur where the orifice is only restrictive, rather than completely blocked, and the system configuration for purposes of convenience might be approximated as an oilspring in series with the fluid damper, the series combination being in parallel with the flexible support element. Hence, in an integral spring-piston vibration isolator element, fluid damping forces are achieved at the expense of suffering a higher resonant frequency. In other words, achieving a desired low resonant frequency appears to be somewhat anomalous with achieving the desired fluid damping of such resonant frequencies in an integral device.

It has been discovered that a performance optimum is obtained with a ratio of spring constants which fall within a certain range. If a certain stiffness ratio (e.g., a ratio of the spring constant of the flexible support to the combined spring constant of the flexible support plus damping fluid combination) is provided, then optimum damping performance can be obtained by adjustment of the orifice size without suffering an undue increase in resonant frequency. Too large a stiffness ratio would result in the untoward increase in resonant frequency (in the presence of attempted fluid damping), while too small a ratio would make difficult the control of damping by means of orifice adjustment because compression of the fluid would occur rather than velocity flow.

Accordingly, it is a further object of this invention to provide an integral spring restraint and fluid damper element wherein the stiffness ratio of the spring restraint to the combination spring constant of the damping fluid and spring restraint lies within a certain critical range.

In applications where a return of the load mass to a precise relative initial position with respect to the base is important, assemblies having several dampers do not demonstrate such a property due to the high stiction (e.g., static friction or breakaway friction) of such dampers. Accordingly, yet a further object of this invention is to provide a vibration isolator having a high degree of returnability, that is, one having the ability to precisely return a load mass to an initial position of repose.

In many fluid dampers the principle of linear or viscous damping is employed, with attendant variations in viscosity and damping for variations in temperature, requiring the use of compensation devices. Generally, normally used hydraulic fluids suffer less change in density relative to changes in viscosity for a given change in temperature. Hence, a fluid-damping system depending upon fluid density rather than viscosity is to be desired. The damping force in such a device is additionally a function of product of fluid density and the square of the fluid velocity ($q = \frac{1}{2}\rho V^2$). Such a square law fluid velocity device would further provide an adavntage of increased damping at higher amplitudes.

Therefore, another object of this invention is to provide a simple damping device the performance of which is relatively independent of temperature, and requiring no automatic temperature-sensitive fluid-flow compensation device.

These and other objects of the invention will become apparent from the following description taken in connection with the accompanying drawings in which.

Figure 5:
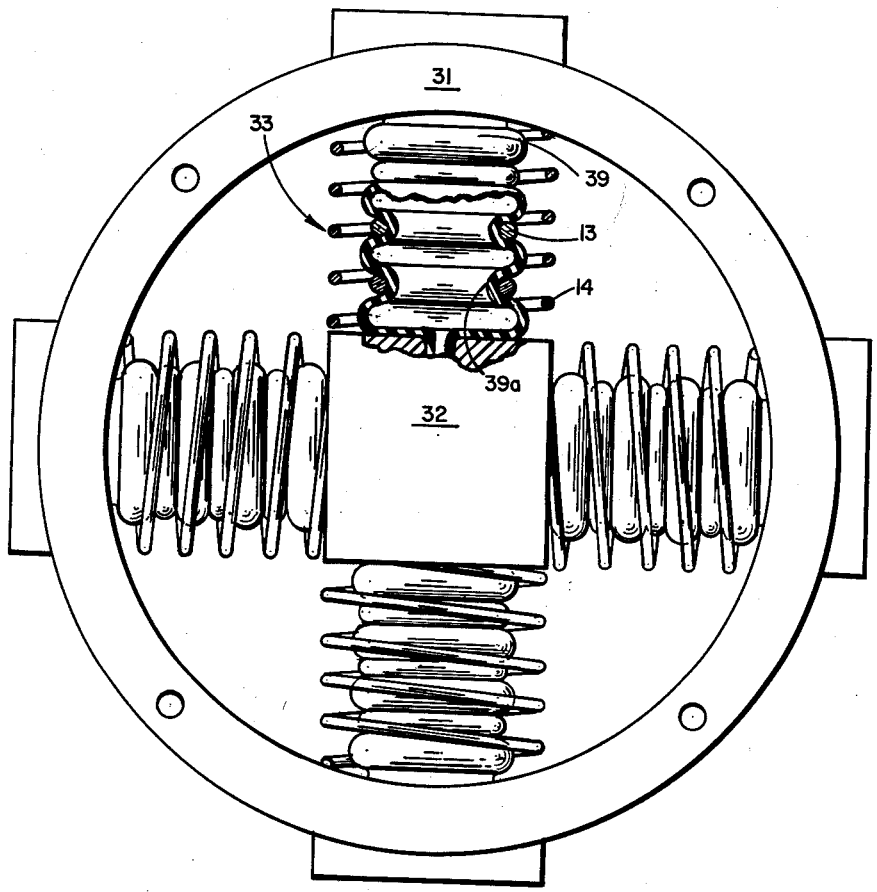

And FIG. 5 is a plan view of another alternative embodiment.

In the drawings, like reference characters refer to like parts.

Figure 1:
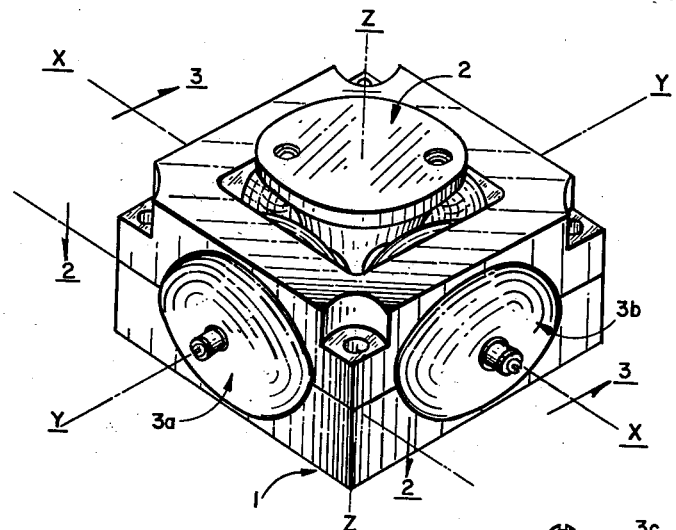
FIG. 1 is an isometric projection of the assembly of one preferred embodiment of the principles of the invention, and indicating certain symmetry in the arrangement of the component parts.
Figure 2:
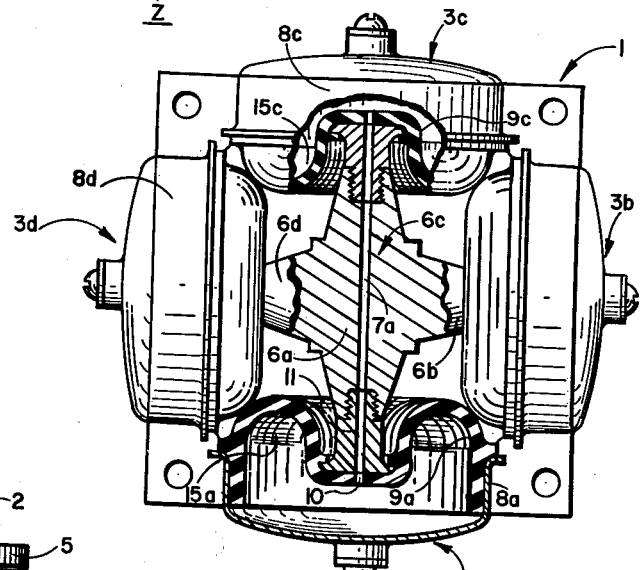
FIG. 2 is a plan view of certain components of the assembly of FIG. 1, illustrating the symmetry of arrangement of such components, and with parts broken away, and others shown in section.
Figure 3:
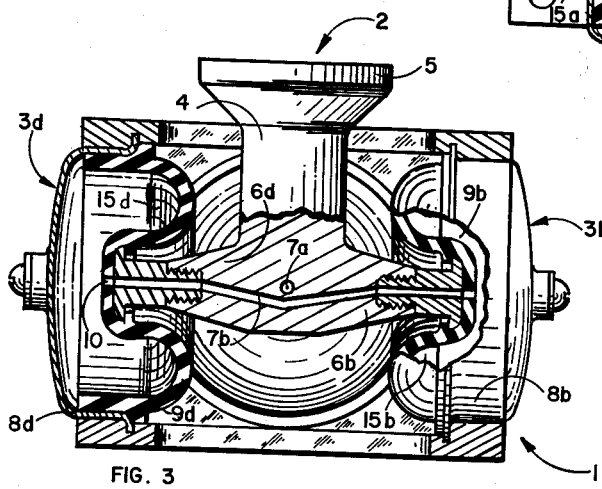
FIG. 3 is a center section, taken on lines YY' and ZZ' through the assembly of FIG. 1 and further illustrating the details of the internal arrangement of the component parts of FIG. 2.

Referring now to FIGS. 1, 2, and 3, one form of vibration isolator embodying the present invention, as shown, comprises a rigid base member 1, a load spool 2, and four flexible support members 3a, 3b, 3c, and 3d. The base member 1 is a rigid rectangular housing including four sides, each with its center pierced to form a circular opening, two opposite edges of each side rigidly joined contiguously with the edge of another said sides, forming a hollow box-like structure having two opposite (top and bottom) faces open. The base member is also provided at its corners with holes adapted to receive bolts (not shown) by which the vibration isolator may be secured to a base. The configuration of the base member is not restricted to such box-like configuration, but could be made in any suitable rigid design which would maintain the several components in the described relation.

The load spool 2, as illustrated, has a central vertically positioned cylindrical core 4 and includes a flat horizontally disposed load plate 5 integral with said core. The load plate is provided with several holes adapted to receive bolts by means of which a load may be fastened to the load spool. Included at and integral with the lower end of such tubular core and extending radially in the same plane from the vertical axis of said spool are four symmetrically arranged cores or load spool extensions 6a, 6b, 6c, and 6d, for structurally connecting each of the flexible support elements to the load spool. An orificed passage 7a extends from the extremity of one load spool extension 6a to that of an oppositely disposed extension 6c, and another similar passage 7b similarly extends from the extremity of load spool extension 6b to load spool extension 6d, such that two orificed passages are contained in the load spool, each being independent of the other in that neither passage communicates with the other. The load spool orificed passages are used to connect in fluid circuit fluid-filled cavities 15a, 15b, 15c, and 15d of oppositely disposed flexible support members, and to provide fluid-damping action, as will be subsequently explained.

Each flexible support member 3a, 3b, 3c, and 3d is made up of two major parts. One of these parts comprises a rigid cylindrical body 8a, 8b, 8c, and 8d open at one end, the open end of which is enclosed by the second part. Each such second part comprises an elastic element 9a, 9b, 9c, 9d of semi-toroidal shape as illustrated. The elastic elements 9a, 9b, 9c, 9d constitute a combination spring-piston member. Each elastic support member, 3a, 3b, 3c, and 3d in the embodiment shown, is positioned within the circular opening of one face of the base member 1 and between the base member and the load spool 2, the rigid structure 8a, 8b, 8c, and 8d of said elastic support member element 3a, 3b, 3c, and 3d being rigidly connected to the base member 1, and the center of the respective elastic elements 9a, 9b, 9c, and 9d being axially and rigidly connected to the respective orificed extensions of the load spool. Each flexible support member 3a, 3b, 3c, and 3d encloses a cavity and has provided an aperture for connecting such cavity in communication with an end of the associated one of orificed passages 7a and 7b in the load spool 2. The cavity in each flexible support member and orificed passage is filled with a fluid such as castor oil or water, whereby translational motion or force of the load spool between a pair of oppositely disposed flexible support members—3d and 3b (such as from left to right in FIG. 3, for example) produces flexural deformation of the elastic elements of such pair of flexible support members, causing a decrease in the volume of one 3b and an increase in the volume of the other 3d resulting in fluid flow between them via the single orificed passageway 7b, which orificed fluid flow also provides velocity damping to the resultant motion thus imparted to the load spool.

Load spool relative motion vectors perpendicular to the direction of fluid-damped motion between a pair of oppositely disposed flexible support elements, say 3b and 3d, (i.e., motion vertically or at right angles horizontally to the exemplary motion described above) will not necessarily result in fluid flow or fluid damping of such motion by that pair of flexible support members 3b and 3d. Instead, the spring-constant of such flexible support members is additive to that of the second pair of flexible support members 3a and 3c in restraining such motion. However, the effective spring constant of the symmetrically deformed first pair of flexible supports is determined by the relative incompressibility of the hydraulic fluid which is resisting a change in volume in both cavities, and the several stiffness constants of the elastic element which is resisting change in shape or deformation, whether flexural or volumetric. Further, this same problem of flexural deformation of position versus volumetric deformation in the elastic element of the flexurible support member in compliance with the damping fluid bulk modulus occurs also in the case of motion along the direction of fluid-damped motion of the load spool. In other words, relative motion between the base and load spool causing asymmetrical deformation of a pair of oppositely disposed support members (such as members 3b and 3d, for example) as to induce fluid flow between the cavities in such pair, will result in (1) restriction to fluid flow occurring in the damping orifice of the load spool as a function of flow velocity, with limited rate of change of volume in a given cavity, and (2) resultant elastic deformation of the elastic element in both flexure and tension. The deformation in tension is due to the resistance of the confined fluid to a change in volume, such that the change in shape of the elastic element represents a balloon-like action caused by the combined spring restraint of the elastic element to the relatively constant volume fluid and to the relative motion between the load spool and base. If the spring constant in flexure were much stiffer than the spring constant in tension for the elastic element, the combined forces of load spool relative motion and relatively constant volume fluid would result in balloon-action and only little damping action. Further, the elastic element would be in danger of being burst or damaged by lightly damped vibrations.

A preferred characteristic of the elastic element would be isoelasticity. In other words, it would be desirable that the elastic element demonstrate the same spring constant to deformation forces in any direction. In order to approach such effect in practice, the elastic elements 9a, 9b, 9c, and 9d have been made in the illustrated semi-toroidal shape with a piston element 11 formed by the center thereof, as shown in FIGS. 2 and 3. Such configuration results in substantially the same tensile or compressive loading along the periphery of the curved elastic element and the same flexural bending in response to external forces in any direction when applied to the piston element 11 seated in the center of the toroid section. Further, the forces of the confined damping fluid upon the elastic element, under load, is similarly resisted. Hence, a common elastic property is thus employed. In practice each elastic element appears as an isoelastic element for limited excursions. This feature is significant in that the resonant frequency of the assembly varies as a function of effective spring constant, and a given damping effect represents a damping ratio which will also vary as a function of effective spring constant. In other words, a critical damping ratio would be difficult to maintain if the spring constant were variable under operating conditions of use.

Under the conditions of a rapidly applied compressive axial load, too much balloon-action of the elastic element will result during attempted damping of fluid communication from such elastic element to the corresponding elastic element. In other words, where the orificed passage in the load spool restricts high velocity fluid flow, constant volume deformation of the elastic element occurs, rather than velocity damping, if the damping fluid is relatively incompressible. This problem is peculiar to integral vibration isolator elements in which the elastic element and damper-piston are combined in a single member. Also, such problem is further aggravated in a device providing multi-axis damping. This aggravation is due to the difference in the spring constant effect presented to forces applied in a given direction, due to deformation of the elastic element caused by forces applied in a mutually orthogonal direction. If, however, a relatively compressible damping fluid is used, then little damping force is developed and such fluid is compressed, instead. It has been discovered, however, that optimum performance of the system can be obtained if a critical value of stiffness ratio is provided. Such stiffness ratio is defined as the ratio of (1) the spring constant in flexure of the elastic element to (2) the combined spring constant of the confined fluid and elastic element. The combined spring constant of the elastic element and damping fluid is determined with the orifices temporarily blocked for measurement purposes only. The spring constant in flexure of the elastic element is determined with the cavity of the flexible support member devoid of damping fluid and at atmospheric pressure. With a critical stiffness ratio of approximately 1:3, adjustment of the orifice size for optimum fluid damping is not extremely critical. In practice, an allowable range for such ratio includes values between 1:1½ and 1:5, although 1:3 has been found to be a preferred value.

Figure 4:
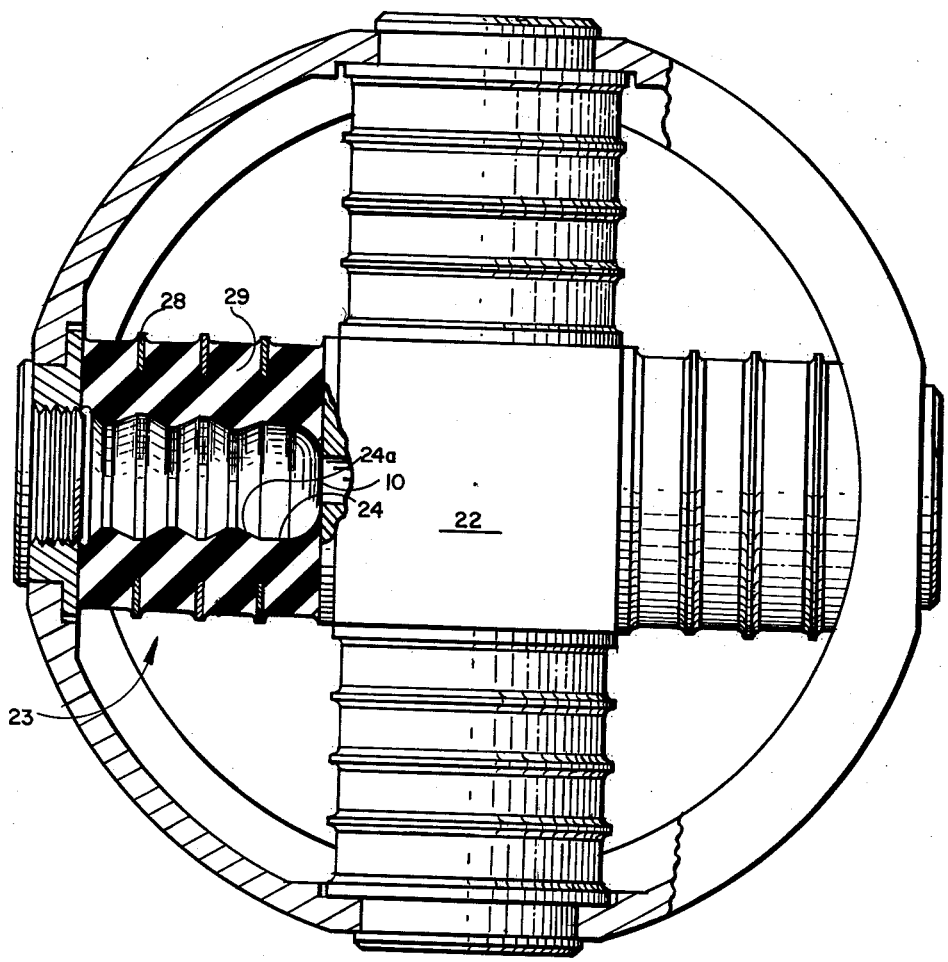
FIG. 4 is a plan view of an alternative embodiment.

In FIGS. 4 and 5 are shown additional embodiments employing several alternate configurations for the elastic element which are capable of achieving the desired relationship between the several flexural and volumetric spring constants of the elastic element, and of being adjusted in design to achieve the desired stiffness ratio. In FIG. 4, for instance, is illustrated an embodiment wherein each flexible support member comprises an axially laminated cylinder 23. Each such cylinder is constructed with alternate cross sections of elastomeric material 29 and rigid material 28, such as steel, adjacent sections being bonded together and the two terminal sections consisting of rigid material, one terminal section being adapted to connect to the load member 22 which corresponds in function to the load spool 2 of FIGS. 1 and 3 and containing an aperture 10 to communicate with passage means (not shown) in said load member, and the other terminal section being adapted to connect to the base plate 21. The internal wall 24 of the cylinder formed by the elastomeric material is shaped in a series of axially spaced sections each curved convexly toward the axis of said cylinder as indicated at 24a, such as to bulge inwardly upon axial compression. The bulging caused by this shape serves to aid in decreasing the cavity volume in response to such compression.

In FIG. 5 is illustrated an embodiment which is substantially functionally equivalent to that illustrated in FIG. 2, but differing with respect to the configuration of the elastic support element. This embodiment employs a flexible support 33 comprising a single elastomeric structure 39 shaped in the manner of a series of axially contiguous toroidal or donut shaped surface sections. A rigid ring 13 is externally mounted upon and radially restrains each interface 39a between adjacent donut sections. A helical spring 14 is mounted externally concentric to and radially spaced apart from the elastomeric structure, both the elastomeric structure and helical spring being adapted to rigidly connect between the load member 32 and the base plate 31, the cavity contained by the elastomeric structure communicating with an orificed passage in the load member.

The elastomeric structure is so soft in axial compression and tension relative to the helical spring as to contribute little to the fluid-empty "unblocked" spring rate along the intended axis of operation. Instead, major design control of the first resonant frequency or lower break frequency is accomplished by selection of the helical spring. The size and thickness of the elastomer element with associated restraining rings is selected to effect control of the volumetric deflection of the structure when the cavity is filled with damping fluid and the damping orifice is blocked. In other words, the stiffness ratio of the illustrated embodiment may be controlled by the geometry of the elastomer, while the general range of response may be controlled by the spring constant of the helical spring.

It will be seen that the device of this invention provides simple and reliable means for achieving fluid-damped vibration isolation along two mutually orthogonal axes. The device may be used in any orientation and the references herein to horizontal and vertical orientations are exemplary only.

Although the invention has been described and illustrated in detail, it is to be clearly understood that the same is by way of illustration only and is not to be taken by way of limitation, the spirit and scope of this invention being limited only by the terms of the appended claims.

I claim:

1. A vibration-absorbing mounting for absorbing vibration between two relatively moving elements comprising, a base member, having four sides each with its center pierced to form a circular opening, two opposite edges of each said side joined contiguously with the edge of another of said sides, forming four sides of a hollow cube having two opposite faces open; a load spool, including a mounting plate parallel to and spaced from said base member and containing first and second mutually independent orificed passages extending substantially parallel to said mounting plate and perpendicular to each other, the ends of each of such passage terminating adjacent opposing sides of the base member; four resiliently deformable supports, each oppositely disposed relative to one other and positioned within a circular opening of a face of said base plate and between said base plate and said load spool, and each support including a flexible semi-toroidal body and a rigid vessel, said semi-toroidal body and said rigid vessel being joined to each other to provide an enclosed fluid-tight cavity therebetween, a center area of said flexible body being rigidly connected to said load spool and having an aperture connecting with an end of one of said orificed passages in said load spool to provide fluid communication by means of said passage with an oppositely disposed flexible support; said cavities, and said connecting orificed passages being filled with a relatively incompressible fluid.

2. The structure recited in claim 1 wherein the resiliently deformable supports have a stiffness ratio which is within the range of 1:1½ to 1:5.

3. A vibration isolator for absorbing vibration between two relatively moving elements comprising load means for mounting a load; a base member encompassing said load means; first, second, third, and fourth resiliently deformable supports, each support being positioned between and intercoupling with said load means and said base member, said first and third supports being oppositely disposed relative to each other and mutually spaced along a first line, said second and fourth supports being adjacent both said first and third supports and being similarly oppositely disposed relative to each other along a second line normal to said first line, each of said supports having a cavity; said load means having first and second mutually independent orificed passages, said first passage interconnecting between and communicating with the cavities of said first and third flexible supports, and said second passage similarly interconnecting between and communicating with the cavities of said second and fourth supports, all said cavities and passages being filled with a relatively incompressible fluid, whereby six degree freedom of motion of the load means along and about three mutually orthogonal axes relative to the base member means is spring-restrained and allowable translational motion of said load means along a first and second axis of said three axes is further subject to fluid damping.

4. The structure claimed in claim 3 wherein the resiliently deformable supports each have a stiffness ratio which is within the range of 1:1½ to 1:5.

5. The device claimed in claim 3 wherein each resiliently deformable support comprises an axially laminated cylinder comprising alternate cross sections of elastomeric material and rigid material, such as steel, adjacent sections of which are bonded together, the internal wall of said cylinder formed by the elastomeric material being shaped in a series of axially spaced sections each curved convexly toward the axis of said cylinder.

6. The device claimed in claim 3 wherein each resiliently deformable support comprises a single elastomeric structure shaped in the manner of a series of axially contiguous donut shaped surfaces, rigid rings externally mounted upon and radially restraining the interfaces between adjacent donut shaped sections, a helical spring concentric to and radially spaced apart from said elastomeric structure, both said elastomeric structure and said helical spring connecting said load means and said base member.

7. The device claimed in claim 3 wherein each resiliently deformable support comprises an axially laminated cylinder comprising alternate cross sections of elastomeric material and rigid material, such as steel, adjacent sections of which are bonded together, the internal wall of said cylinder formed by the elastomeric material being shaped in a series of axially spaced sections each curved convexly toward the axis of said cylinder, said device having a stiffness ratio within the range of 1:1½ to 1:5.

8. The device claimed in claim 3 wherein each resiliently deformable support comprises a single elastomeric structure shaped in the manner of a series of axially contiguous donut shaped surfaces, rigid rings externally mounted upon and radially restraining the interfaces between adjacent donut shaped sections, a helical spring concentric to and radially spaced apart from said elastomeric structure, both said elastomeric structure and said helical spring connecting said load means and said base member, said device having a stiffness ratio within the range of 1:1½ to 1:5.

9. A vibration isolator comprising elastic means providing a series of cavities having a volume which varies with deformation of said elastic means, a fluid in said cavities, passage means for providing restricted fluid communications between at least some of said cavities, said isolator having a stiffness ratio within the range of 1:1½ to 1:5, said stiffness ratio being the ratio of (1) the spring constant in flexure of the elastic means to (2) the combined spring constant of the said fluid and elastic means, a base member, and a load member, said elastic means comprising first and second elastic support members connected between said base member and said load member on opposite sides of the load member, third and fourth elastic support members connected between said base member and load member on opposite sides of the load member and being arranged about the load member in a quadrature relation with respect to said first and second elastic support members, each elastic support member comprising a rigid cylindrical body open at one end and the other end thereof being closed and fixed to the base member and an elastic element of semi-toroidal shape secured to the open end of said cylindrical body and to said load member, said passage means comprising an aperture in each said elastic element adjacent its connection to the load member and first and second mutually independent conduits formed in said load member respectively connecting the apertures of the first and second elastic support members and the apertures of the third and fourth elastic support members.

10. A vibration isolator comprising elastic means providing a series of cavities having a volume which varies with deformation of said elastic means, a fluid in said cavities, passage means for providing restricted fluid communications between at least some of said cavities, said isolator having a stiffness ratio within the range of 1:1½ to 1:5, said stiffness ratio being the ratio of (1) the spring constant in flexure of the elastic means to (2) the combined spring constant of the said fluid and said elastic means, a base member, and a load member, said elastic means comprising first and second elastic support members connected between said base member and load member on opposite sides of the load member, third and fourth elastic support members connected between said base member and load member on opposite sides of the load member and being arranged about the load member in a quadrature relation with respect to said first and second members; each elastic support member comprising an axially laminated cylinder comprised of alternate cross sections of elastomeric material and rigid material adjacent sections of which are bonded together, the internal wall of said cylinder formed by the elastomeric material being shaped in a series of axially spaced sections, each curved convexly toward the axis of said cylinder, one end of said cylinder being fixed to said base member, and the other end of said cylinder being secured to said load member, said passage means comprising an aperture in each elastic support member adjacent its connection to the load member and first and second mutually independent conduits formed in said load member respectively connecting the apertures of the first and second elastic support members and the apertures of the third and fourth elastic support members.

11. A vibration isolator comprising elastic means providing a series of cavities having a volume which varies with deformation of said elastic means, a fluid in said cavities, passage means for providing restricted fluid communications between at least some of said cavities, said isolator having a stiffness ratio within the range of 1:1½ to 1:5, said stiffness ratio being the ratio of (1) the spring constant in flexure of the elastic means to (2) the combined spring constant of the said fluid and said elastic means, a base member, and a load member, said elastic means comprising first and second elastic support members connected between said base member and load member on opposite sides of the load member, third and fourth elastic support members connected between said base member and load member on opposite sides of the load member and being arranged about the load member in a quadrature relation with respect to said first and second members, each elastic support member comprising a single elastomeric structure shaped in the manner of a series of axially contiguous donut shaped surfaces, rigid rings externally mounted upon and radially restraining the interfaces between adjacent donut shaped sections, a helical spring concentric to and radially spaced apart from said elastomeric structure, both said elastomeric structure and said helical spring connected between said load member and said base member, said passage means comprising an aperture in each said elastomeric structure adjacent its connection to the load member and first and second mutually independent conduits formed in said load member respectively connecting the apertures of the first and second elastic support members and the apertures of the third and fourth elastic support members.

References Cited in the file of this patent

UNITED STATES PATENTS

| | | |
|---|---|---|
| 1,602,079 | Kraft | Oct. 5, 1926 |
| 1,884,477 | Wood | Oct. 25, 1932 |
| 2,312,718 | Kouyoumjian | Mar. 2, 1943 |
| 2,700,458 | Brown | Jan. 25, 1955 |

FOREIGN PATENTS

| | | |
|---|---|---|
| 698,953 | Great Britain | Oct. 28, 1953 |
| 797,530 | Great Britain | July 2, 1958 |
| 802,579 | Great Britain | Oct. 8, 1958 |
| 345,504 | Switzerland | May 13, 1960 |